United States Patent
de Grood et al.

(10) Patent No.: US 8,556,392 B2
(45) Date of Patent: Oct. 15, 2013

(54) METHOD AND DEVICE FOR DISPENSING A LIQUID

(75) Inventors: Johannes Petrus Wilhelmus de Grood, Alverna (NL); Pascal Johannes de Grood, Nijmegen (NL)

(73) Assignee: De Grood Innovations B.V., Nijmegen (NL)

( * ) Notice: Subject to any disclaimer, the term of this patent is extended or adjusted under 35 U.S.C. 154(b) by 446 days.

(21) Appl. No.: 12/624,920

(22) Filed: Nov. 24, 2009

(65) Prior Publication Data
US 2011/0121016 A1    May 26, 2011

(51) Int. Cl.
*B41J 2/175*  (2006.01)
*B41J 2/17*   (2006.01)

(52) U.S. Cl.
USPC .................................. 347/85; 347/84; 347/86

(58) Field of Classification Search
USPC ............................................. 347/84, 85, 86
See application file for complete search history.

(56) References Cited

U.S. PATENT DOCUMENTS

| | | |
|---|---|---|
| 4,380,018 A | 4/1983 | Andoh et al. |
| 2006/0034984 A1 | 2/2006 | Baydo et al. |
| 2010/0020126 A1* | 1/2010 | Takahashi ..................... 347/30 |

FOREIGN PATENT DOCUMENTS

| | | |
|---|---|---|
| DE | 60116948 | 8/2006 |
| EP | 0634273 | 1/1995 |
| EP | 1161880 | 12/2001 |
| ES | 2191528 | 9/2003 |
| WO | WO 00/28215 | 5/2000 |
| WO | WO 2006/041222 | 4/2006 |

* cited by examiner

*Primary Examiner* — Jannelle M Lebron
(74) *Attorney, Agent, or Firm* — Novak Druce Connolly Bove + Quigg LLP

(57) ABSTRACT

Device and method for dispensing a liquid, comprising a liquid container; a plurality of dispensing openings connecting to the liquid container for controlled dispensing of the liquid to a substrate, and at least one membrane which connects onto the dispensing openings and which is displaceable between a first sealing position, in which the dispensing openings are covered by the membrane, and a second opened position in which the dispensing openings are left clear by the membrane, which device is also provided with a medium-filled control system which connects to the membrane such that the membrane is displaceable between the first and the second position by means of pressure variation on the medium.

20 Claims, 4 Drawing Sheets

METHOD AND DEVICE FOR DISPENSING A LIQUID

The present invention relates to a method and device for dispensing a liquid. The invention relates particularly to arranging on a substrate a material layer of a different material, wherein both materials are for instance formed by food products. Alternatively, the materials can also be formed by a decorative enameling and tiles or the like. Adhesive can herein be applied for instance to specific adhesive surfaces in a manner such that products are for instance coated with polymer or varnish while leaving the edges clear (edge-free coated) so as to thus prevent fouling of a conveyor belt. More specific examples of this type of process are the arranging of a decorative filling or a surface decoration on cosmetics packages and the printing of pharmaceutical products.

BACKGROUND OF THE INVENTION

In the production of food products it may in some circumstances be advantageous or desirable to arrange a second food product on a substrate formed by at least one first food product, this second food product being placed as a layer on the first food product. The second food product can for instance have a colour differing from that of the first food product in order to thus impart a decorative effect to the combination. Another possibility is that a desired effect, for instance a conserving effect, can be obtained by the different material properties. The second food product can be arranged in different forms, such as for instance in the form of an image, an icon, a text or a pattern, although a full or partial coating of the second food product is also possible. The first food product can herein be a substantially solid substance, such as chocolate, or a gelatinous substance such as a dessert or yoghurt, while the second food product consists, at least during dispensing, of a liquid or a liquid emulsion such as yoghurt, mayonnaise, sauce, oil and so forth.

Devices for applying a decoration to a food product are per se known. WO 01/93691 describes a device in which a number of nozzles are placed in an array for the purpose of applying a decoration in the form of a bitmap by means of spraying. The device has per nozzle a dispensing means which comprises a cylinder with a piston for dispensing a predetermined quantity of the liquid. It is further proposed to place the array at an oblique angle to a direction of movement of the first food product in order to thus increase the possible resolution of a decoration to be applied.

Such a device has various drawbacks. Due to its complex construction with narrow feed channels, cylinders and pistons, it is difficult to clean, which represents a problem because of the strict hygiene requirements in for instance the processing of food products. The described device further functions slowly as a result of the required alternating pattern of movement of the piston during dispensing of the liquid. In addition, there is a possibility of the liquid solidifying in the channels, whereby the device requires a high level of maintenance. This essential maintenance is increased still further here due to the great wear of the plunger and nozzle as a result of the moving parts.

An alternative for dispensing a liquid food product is known from ES 1 191 528, which describes a device for filling containers for liquid substances. This device however also has the drawback that dispensing of an accurate, very small quantity of liquid, in the order of magnitude of a droplet, is not possible herewith due to the large liquid storage capacity of the supply and discharge channel and the high resistance the channel provides to the liquid. Due to the force exerted thereon the membrane is further subject to great wear, which makes the embodiment susceptible to wear. Moreover, ES 1 191 528 does not disclose one device having a plurality of dispensing openings.

WO 2006/041222 describes a body-insertable apparatus, clearly not intended nor suitable for controlled dispensing of a liquid to a substrate. The apparatus comprises a balloon member, which is expandable by adding a medium via communication pipe. The balloon acts to generate a changing volume of a chamber in order to generate a liquid flow out of the apparatus of into the apparatus. However, the dispensing opening in the apparatus is continuously uncovered, so the liquid in the chamber cannot be placed under pressure.

It is therefore an object of the present invention to provide a device for dispensing a liquid, such as a food product, which obviates at least one of the above stated drawbacks, or provides a usable alternative.

SUMMARY OF THE INVENTION

The invention provides for this purpose a device for dispensing a liquid or liquid substance such as for instance a suspension, an emulsion or a dispersed material according to claim 1. The device comprises a container for the liquid such as yoghurt, mayonnaise, sauce, oil, etc., onto which connect a plurality of dispensing openings for dispensing the liquid to a substrate in controlled and targeted manner. The device further comprises at least one membrane which connects onto the dispensing openings and which is displaceable between a first sealing position, in which the dispensing openings are covered by the membrane, and a second opened position in which the dispensing openings are left clear by the membrane. The device is also provided with a medium-filled control system which connects to the membrane such that the membrane is displaceable between the first and the second position by means of pressure variation on the medium. Owing to the absence of (voluminous) mechanical drive means the mass inertia of the device is minimal during displacing of the membrane, whereby it can be displaced at great speed between the first sealing position and the second opened position. The liquid can thus be dispensed with great precision and at high speed. The medium-filled control system can consist as desired of a hydraulic or pneumatic system.

The container can be provided with the liquid in per se known manner, for instance via at least one supply opening therefor. The container can be further provided with means such as heating means for making or keeping liquid the food product which is dispensed, as well as with a device for blending or mixing the liquid in the reservoir in order to keep it liquid. The dispensing openings can each adjoin a nozzle incorporated in a wall of the container, or be provided with a channel extending at least partly into the container.

A wall of the container in which the dispensing openings are incorporated preferably extends connecting to the dispensing opening over more than 50%, and in an ideal case 100%, of the opening in the plane of the opening so as to thus create the most limited resistance possible during liquid passage. It is most advantageous here if the dispensing openings connect over their full periphery to the liquid container. A connection over a substantial part of the periphery to the liquid container has the additional advantage that the supply of the liquid can take place relatively quickly. Viscous liquid can thus for instance also be supplied relatively quickly.

Obstructing the supply of the liquid to the closing valve or the discharge channel as little as possible creates the possibility of accurate dosing. The liquid is preferably not carried through a narrow feed pipe or any other obstruction which impedes a free throughflow.

In a further embodiment of the device according to the present invention a wall of the container is provided with dispensing openings and the device is provided with individual parallel liquid channels connecting the liquid container to the dispensing openings. The number of channels is here for instance equal to the number of dispensing openings, one channel can lead the liquid to a plurality of dispensing openings or, conversely, a plurality of channels can lead the liquid to one dispensing opening. The dispensing openings are isolated from each other by arranging the channels, thereby reducing unevenness in the dispensing of the liquid from a determined dispensing opening as a result of interference between this dispensing opening and adjacent or nearby dispensing openings.

The outer ends of at least one channel, and preferably the ends of all channels, can herein debouch in the reservoir, wherein the device is adapted to circulate the liquid via the at least one channel when the membrane seals the at least one dispensing opening to which the channel carries liquid.

The channels preferably extend with at least one directional component perpendicularly of the direction in which the dispensing openings are adjacently located. In order to provide a good throughfeed the channels have a length of 10 to 60 mm, a width of 1 to 10 mm and a height of 0.5 to 2 mm.

Irrespective of the presence of the channels, the wall of the container in which the dispensing openings are incorporated can extend connecting to the dispensing opening over more than 50% in order to guarantee a low-resistance supply channel for the liquid.

In an embodiment of the present invention the dispensing openings adjoin a nozzle mounted in a wall of the container, a dispensing opening of which nozzle is provided with an acute angle so that no (droplet of) liquid for dispensing can remain on the nozzle under the influence of adhesive force.

During operation the membrane is displaced at a speed such that the liquid leaves the dispensing opening at a determined starting speed. This starting speed lies between 1 and 20 m/s, and preferably between 5 and 10 m/s. The device hereby presses (or fires) the liquid in the direction of the base to be provided with liquid. The starting speed at which the liquid is pressed out of the device can be controlled by varying the pressure and the flow rate of the medium with which the membrane is displaced. The speed of membrane displacement is selected to match the substrate to be provided with liquid. In the case of a gelatinous substrate a lower speed will generally be selected than in the case of a solid substrate in order to prevent the liquid droplets penetrating the substrate for decorating.

The liquid is preferably urged out of the dispensing openings in droplets of 0.2 µl to 0.1 ml. An advantageous membrane displacement has a frequency between 1 and 500 Hz, in particular 100 Hz to 500 Hz, and preferably around 100 Hz. In order to ensure a good sealing the medium pressure exerted on the membrane in a closed position of the dispensing opening is here at least 0.2 bar higher than the pressure of the liquid in the liquid container which has to be dispensed. The device is preferably dimensioned here to dispense a liquid with a viscosity above 15 centipoise. For this purpose the dispensing openings have a cross-section between 0.25 and 5 mm.

The smaller the nozzle-diameter becomes, the more pressure is needed to dispense the liquid through. It those cases, it is preferential to have a relatively short discharge channel length through the nozzle. Especially the range between 0.25 and 1 mm, and more particular between 0.4 and 0.7, and especially about 0.5 mm, has appeared to give surprisingly fine dispensing results, when a length of the discharge opening through the nozzle is maximized between 4 and 10, and especially about 6 mm respectively. For example a nozzle with a 0.5 mm diameter works has proven to provide very good results when its discharge channel length is below 6 mm. Above that length, especially when a fluid with a high viscosity is used, the risk grows that fluid drops to be dispensed stick to the nozzle due to adhesion forces.

In an embodiment of the present invention the membrane forms a wall of the container or adjoins a wall of the reservoir on the inner side thereof. The container can for instance comprise a lower wall in which at least one nozzle with a discharge channel for the liquid is arranged, this discharge channel extending in the reservoir as far as the membrane. In a first position the membrane herein rests or clamps on the discharge channel. In a second position the membrane is separated from the discharge channel in that it is stretched into a space which adjoins the container on the upper side, wherein the upper wall of the container comprises in the vicinity of the discharge channel an opening for stretching of the membrane therethrough.

Adjacently of the opening can be situated a chamber for applying a pressure therein which can be an overpressure or an underpressure such as a vacuum. This pressure can for instance be generated by an electrical actuator. Dispensing of the liquid takes place substantially under the influence of the movement of the membrane, wherein the membrane ejects a measured quantity of liquid from the device.

In order to apply a desired decoration more quickly, an assembly of devices according to the present invention can be used, thus forming a decorating device with a plurality of dispensing openings. Dispensing openings for the liquid substance of respective devices of the assembly can herein be disposed in a matrix form. In an embodiment such a matrix can comprise a single row of dispensing openings. In order to decorate the substrate at high speed the matrix can be provided with a number of dispensing openings such that a two-dimensional decoration can be applied in one operation. The matrix can here comprise for instance 8 to 32 or even to for instance 64 rows. In addition, it is possible to apply a plurality of columns, for instance 8. In this manner an image can be applied to a food product in one spraying operation with a multiple spraying treatment via a selection of the various dispensing openings. It will be apparent that the number of rows and columns does not have to be equal but can be modified to a desired format of the decoration. The mutual distance between the delivery points and the size of the openings thereof can also be modified to the desired format of the decoration and the viscosity of the liquid for dispensing.

As the number of nozzles increases, it becomes relevant to take precautions to avoid pressure differences in the fluid delivered to the various dispensing openings or nozzles, due to different channels toward these dispensing openings or nozzles. The device according to the present invention may therefor instead of or in combination with individual parallel liquid channels be provided with at least one transfer channel or plenum, in fluid communication with the liquid container, comprising at least part of the dispensing openings, wherein the throughput area of the transfer channel is smaller than a throughput area of the liquid container. As a result, the transfer channel divides and circulates the liquid, and the pressure towards the various dispensing openings.

In practice, the transfer channel may be embodied by a flat space, adjacent and in fluid communication with the liquid container. The flat transfer channel preferably has a thickness between 0.5 mm and 2 mm, and more specifically between 1 mm and 1.5 mm.

The transfer channel may be in fluid communication with more than one liquid container. Preferably, one liquid container is arranged on each side of the dispensing openings.

In order to simplify the construction a plurality of closures can be formed by a shared membrane. The membrane is preferably made of an elastomer, which has a preferred thickness between 0.3 en 1.5 mm.

In an embodiment in which the substrate is moved relative to the device during decorating, for instance by a throughput device for carrying a substrate through the dispensing device in a first direction, delivery points located in a first column and delivery points located in a second column can be offset relative to each other such that delivery points of the first and second columns do not lie in line in a throughfeed direction of the substrate through the device. A decoration with a relatively high resolution can hereby be formed without the dispensing openings having to be disposed particularly close to each other.

BRIEF DESCRIPTION OF THE DRAWINGS

The invention will now be elucidated on the basis of the following figures, in which.

DETAILED DESCRIPTION OF THE PREFERRED EMBODIMENTS

Figure 1A:
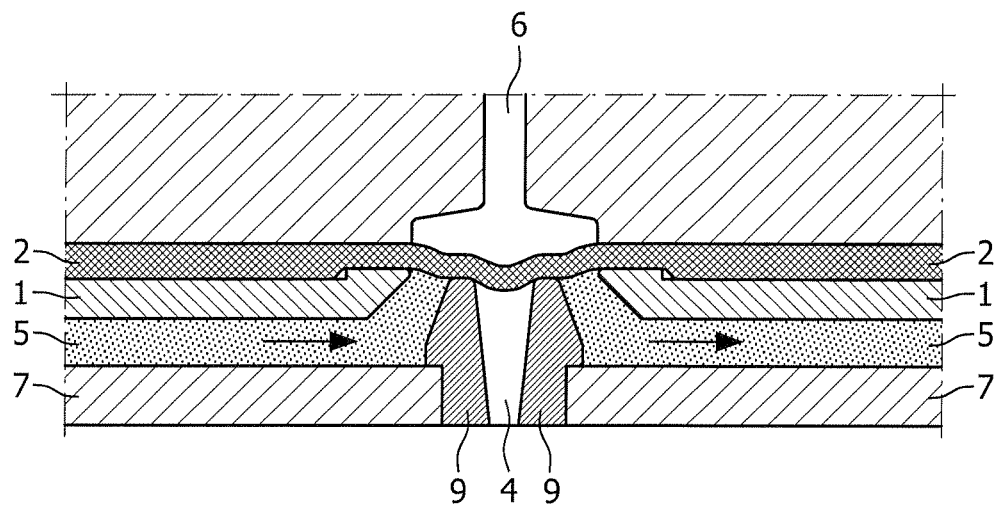
FIG. 1a shows a schematic cross-section of a device for decorating a substrate with a liquid according to the present invention, with a membrane in a first position for sealing a dispensing opening.

FIG. 1a shows a cross-section of a device according to the present invention. The figure shows upper wall 1 and a lower wall 7 of a container for containing a liquid 5. A discharge channel 4 for liquid 5 extends through lower wall 7. Discharge channel 4 is sealed by a closure formed by a membrane 2. Membrane 2 is pressed into a first position thereof by means of air pressure in chamber 6, in which position it seals channel 4 so that the liquid 5 cannot leave the reservoir. Channel 4 is formed in a spray nozzle 9 arranged in lower wall 7.

Figure 1B:
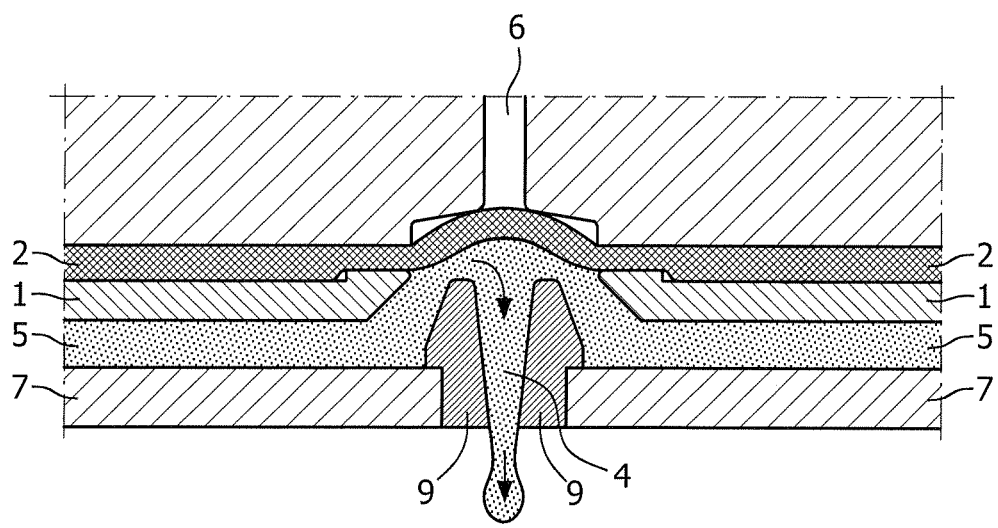
FIG. 1b shows a schematic cross-section of a device for decorating a substrate with a liquid according to the present invention, with a closure in a second position for leaving clear a dispensing opening.

FIG. 1b shows a cross-section of a device according to the present invention of FIG. 1a, wherein membrane 2 is in a second position thereof. The figure again shows upper wall 1 and a lower wall 7 of a container for containing a liquid 5. Discharge channel 4 is now however left clear by the closure formed by membrane 2. Membrane 2 is pulled into a second position thereof by means of a low air pressure, or even a vacuum, in chamber 6, in which position it leaves channel 4 clear so that liquid 5 can leave the reservoir. Liquid 5 can now enter channel 4 from a first direction 8 and a second direction 8. The device is preferably, at least locally around dispensing channel 4, substantially line-symmetrical relative to dispensing channel 4 and, when membrane 2 leaves discharge channel 4 clear, liquid 5 can reach the discharge channel from all sides in simple manner and without obstacles or narrow passages.

Figure 2:
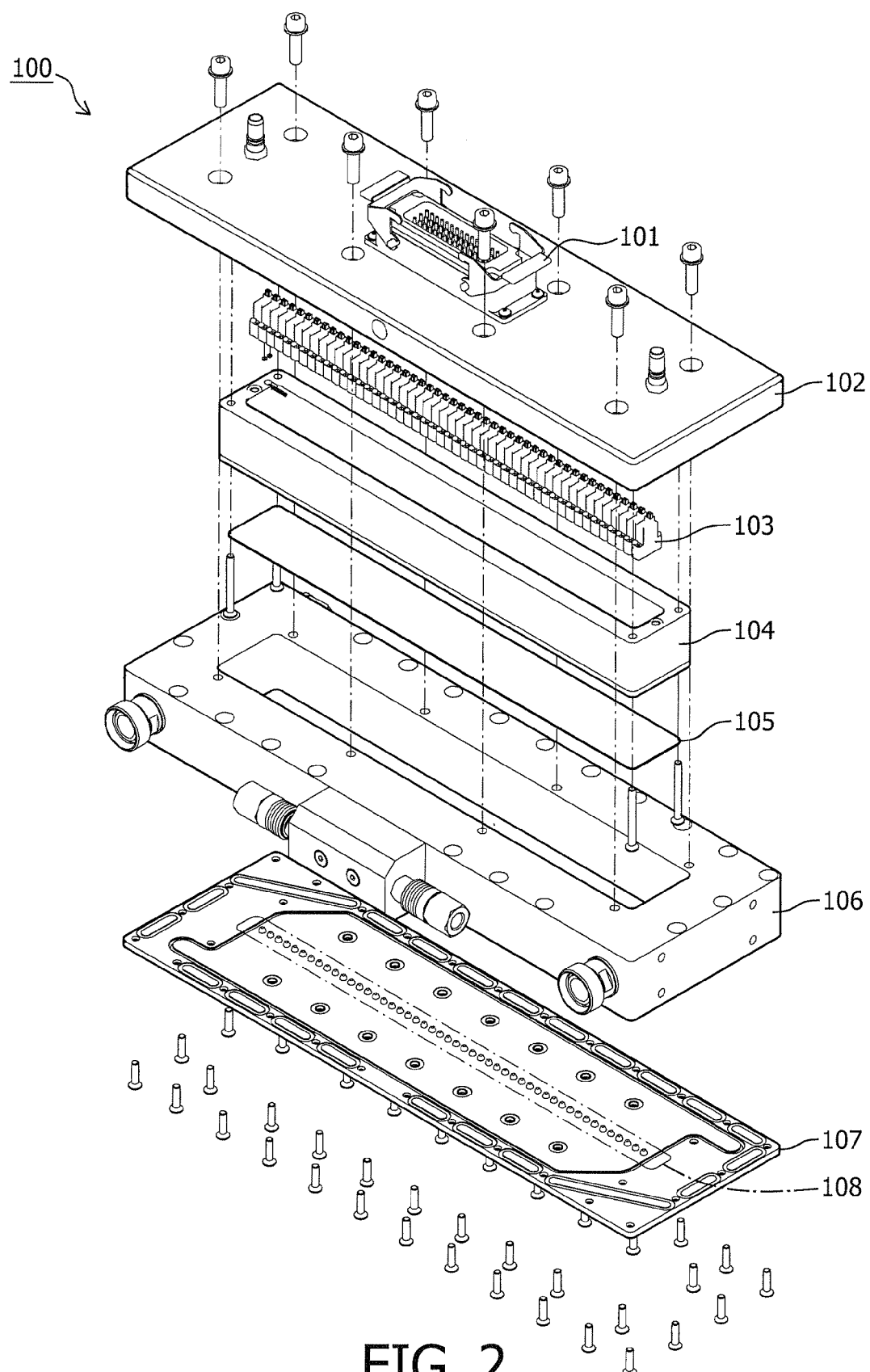
FIG. 2 shows a schematic perspective exploded bottom view of an embodiment of the device according to the present invention.

FIG. 2 shows an exploded top view of a device 100 according to the present invention. The device 100 comprises an electrical connector 101, mounted on a cover plate 102 of the device. The electrical connector 101 is electrically coupled with an array of pneumatic valves 103, which are arranged in a manifold 104. Below the manifold the membrane 105 is arranged. The valves 103, the manifold 104 and the membrane 105 are enclosed by the housing 106, which is covered by the cover plate 102, and at its bottom side closed by nozzle plate 107, which comprises nozzles 108.

Figure 3:
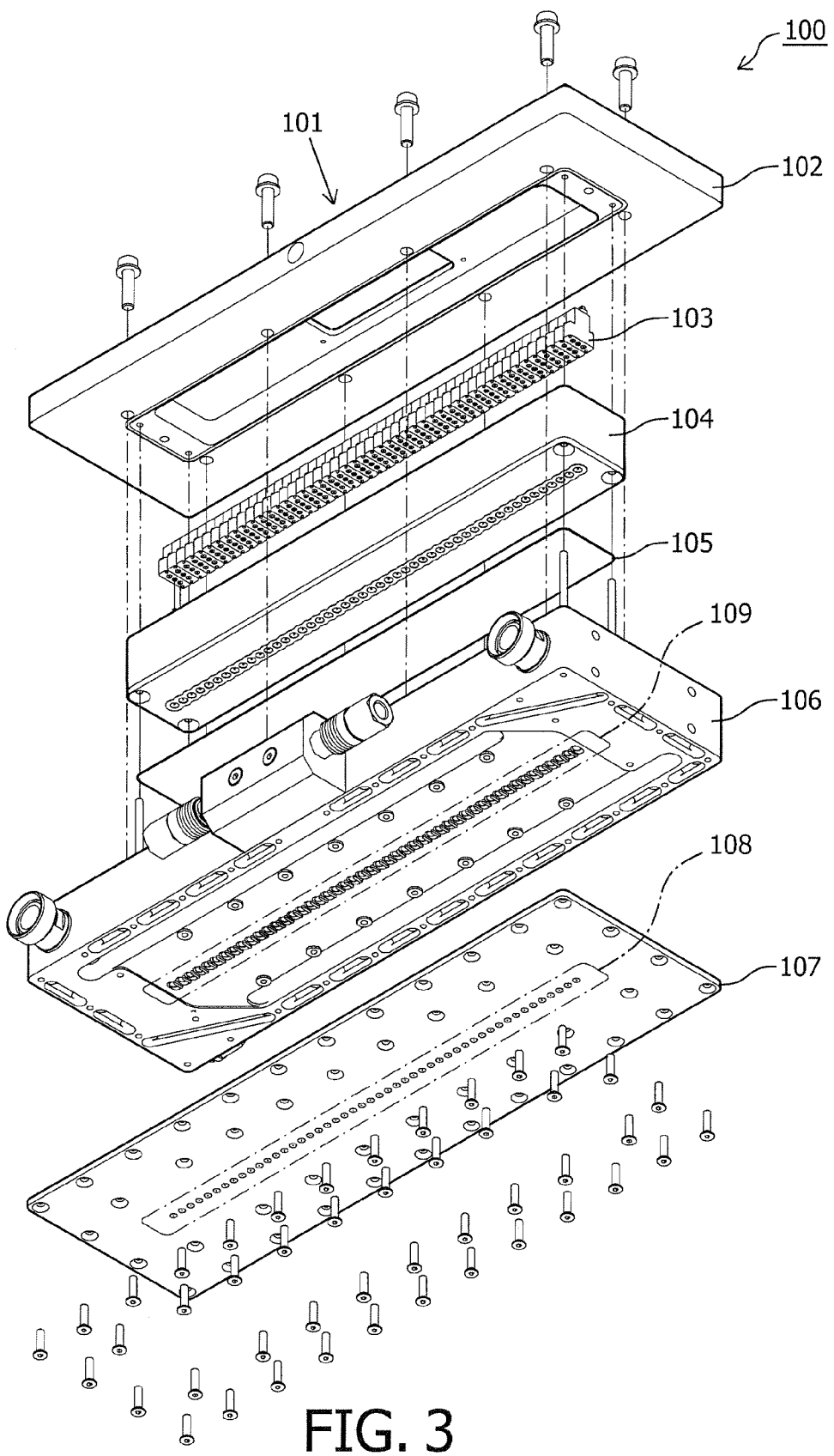
FIG. 3 shows a schematic perspective top view of an exploded embodiment of the device according to the present invention.

FIG. 3 shows the device 100 from FIG. 2, in an exploded perspective bottom view. In the bottom view it is visible that the housing 106 comprises openings 109 that correspond to the nozzles 108 in the nozzle plate 107.

Figure 4:
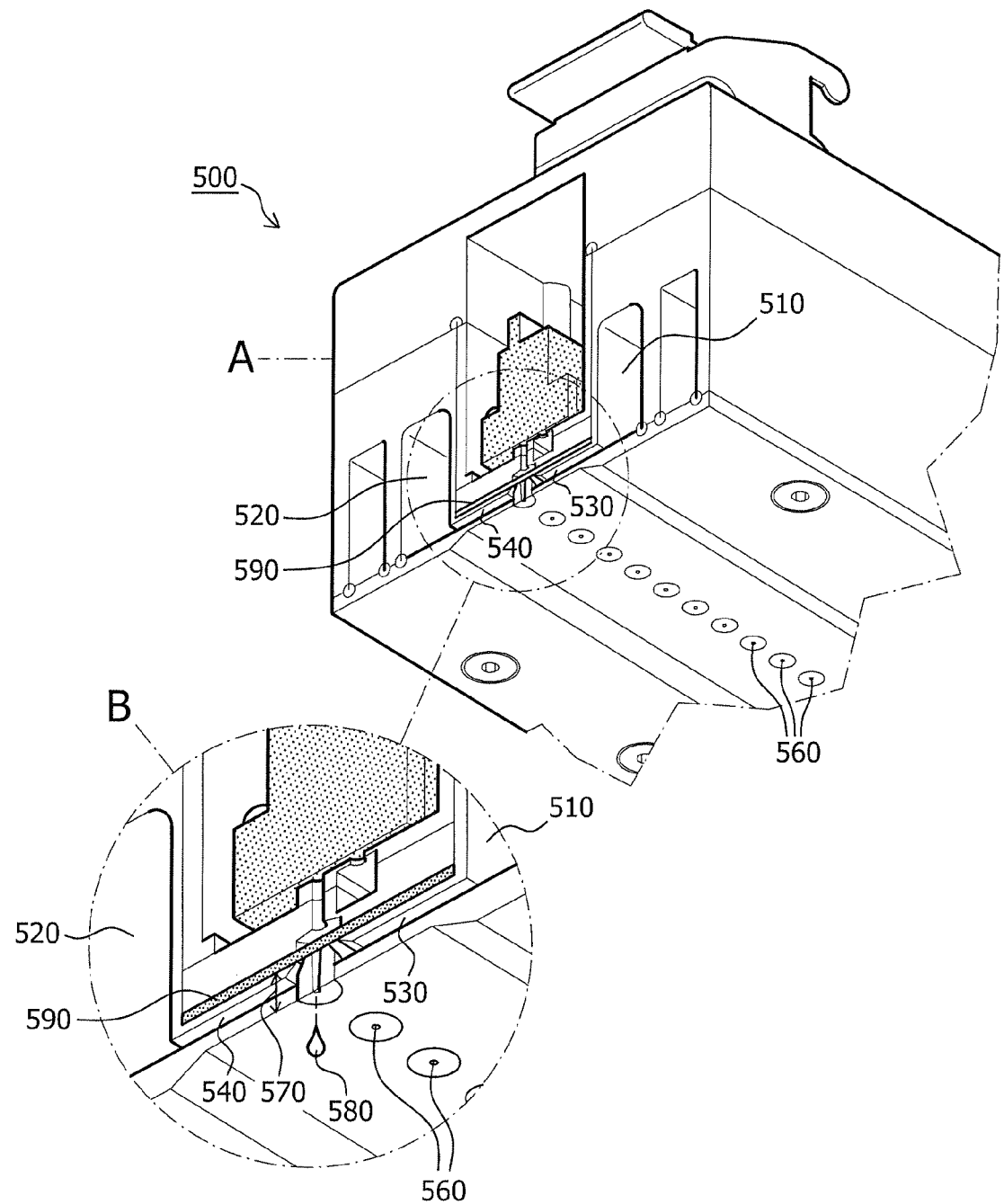
FIG. 4 shows a perspective view of a detail of an embodiment of the present invention.

FIG. 4 shows a perspective view of a detail of an embodiment 500 of the present invention. In the embodiment, the liquid container 510, 520 extends on two sides of the dispensing openings 560, wherein each side of the liquid container is in fluid connection with a transfer channel 530, 540, that comprises the dispension openings or nozzles 560. The transfer channel 530, 540 is embodied by a flat space, adjacent and in fluid communication with the liquid container. The flat transfer channel has a thickness between 0.5 mm and 2 mm, and more specifically between 1 mm and 1.5 mm.

Herein, the throughput area of the transfer channel 530, 540 is smaller than a throughput area of the liquid container 510, 520 for dividing the liquid and the pressure towards the various dispensing openings 560, in order to obtain an equal liquid distribution, especially when all openings are used at the same time. The nozzles 560 have a diameter 570 that is in the range between 0.25 and 1 mm, and more particular between 0.4 and 0.7, and especially about 0.5 and a length through the nozzle (the dispension opening) is maximized between 4 and 10, and especially about 6 mm respectively.

The membrane 590 is made of an elastomer with a thickness between 0.3 en 1.5 mm.

In addition to the described and shown embodiments, various other embodiments are also possible, such as embodiments with a plurality of mutually connected containers, which can for instance comprise different liquids during use for the purpose of applying a decoration with multiple colours. The device can further be provided with a supply device for the substrate for decorating. The pneumatic valves or other means for moving the membrane can be provided with an automated control and can for instance be electrically controllable. The device can also be provided with means for applying a pressure inside the reservoir for dispensing the liquid under the influence thereof. In order to accelerate dispensing of the liquid the pressure in the reservoir is herein preferably a minimum of 0.25 bar higher than the pressure outside the device. The dispensing of the liquid then takes place when the pressure exerted on the membrane by the control system becomes lower than the pressure of the liquid in the reservoir. The liquid then urges the membrane into the opened position.

When channels are arranged for carrying the liquid to the nozzles, one or more nozzles can be arranged per channel and the device can be embodied such that the liquid can circulate from reservoir part 440 to liquid container part 450 through channels of nozzles which are sealed by the membrane.

The invention claimed is:

1. A device for dispensing a liquid food material, comprising:
   a liquid container;
   a plurality of dispensing openings connected to the liquid container through a transfer channel for controlled dispensing of the liquid food material from each of the plurality of dispensing openings to a substrate;
   at least one membrane which connects onto the dispensing openings and which is displaceable between:
      a first sealing position, in which the dispensing openings are covered by the membrane;
      a second opened position in which the dispensing openings are left clear by the membrane; and
   a medium-filled control system which connects to the membrane such that the membrane is displaceable between the first and the second position by means of pressure variation on the medium, characterized by means for placing the liquid food material in the liquid container under pressure in order to dispense liquid through the transfer channel, past the open membrane in the second opened position to the dispensing openings, wherein the throughput area of the transfer channel is smaller than a throughput area of the liquid container for dividing the liquid food material and the pressure towards the various dispensing openings.

2. The device according to claim 1, characterized in that the transfer channel is embodied by a flat space, adjacent and in fluid communication with the liquid container.

3. The device according to claim 1, characterized in that the flat transfer channel has a thickness between 0.5 mm and 2 mm.

4. The device according to claim 1, characterized in that the flat transfer channel has a thickness between 1 mm and 1.5 mm.

5. The device according to claim 1, wherein the device comprises a plurality of liquid containers, and wherein the transfer channel is in fluid communication with more than one liquid container.

6. The device according to claim 1, characterized in that the medium-filled control system is a pneumatic control system.

7. The device as claimed in claim 1, characterized in that a wall of the container in which the dispensing openings are incorporated preferably extends connecting to the dispensing opening over more than 50% of the opening in the plane of the dispensing opening so as to thus create the most limited resistance possible during liquid passage.

8. The device as claimed in claim 1, characterized in that a wall of the container in which the dispensing openings are incorporated preferably extends connecting to the dispensing opening over 100% of the opening in the plane of the dispensing opening so as to thus create the most limited resistance possible during liquid passage.

9. The device as claimed in claim 1, characterized in that the membrane forms part of the wall of the liquid container.

10. The device as claimed in claim 1, characterized in that the device is adapted to dispense a liquid with a viscosity above 15 centipoise.

11. The device according to claim 1, wherein the dispensing openings have a diameter in the range between 0.25 and 1 mm.

12. The device according to claim 1, wherein the dispensing openings have a diameter in the range between 0.4 and 0.7 mm.

13. The device according to claim 1, wherein the dispensing openings have a diameter of 0.5 mm.

14. The device according to claim 1, wherein the length of the dispensing openings is maximized between 4 and 10 mm.

15. The device according to claim 1, wherein the length of the dispensing openings is maximized at 6 mm.

16. The device as claimed in claim 1, characterized in that at least one dispensing opening has a cross-section between 0.25 and 5 mm.

17. The device as claimed in claim 1, characterized in that the membrane is made of an elastomer.

18. The device as claimed in claim 17, characterized in that the membrane has a thickness between 0.3 and 1.5 mm.

19. A method for dispensing a liquid food material through a plurality of dispensing openings, comprising the processing steps of:
   A) introducing a liquid for dispensing into a liquid container;
   B) applying a pressure to the liquid food material which is higher than the ambient pressure;
   C) carrying the liquid food material to the dispensing openings via a transfer channel, wherein the transfer channel is in fluid communication with the liquid container;
   D) opening and closing the openings in controlled manner per dispensing opening by means of displacing a membrane,
   wherein the membrane connects onto the dispensing openings and is displaceable between:
      a first sealing position in which the dispensing openings are covered by the membrane;
      a second opened position in which the dispensing openings are left clear by the membrane and
   E) dispensing the liquid food material through the transfer channel, past the open membrane in the second opened position to the dispensing openings, wherein the throughput area of the transfer channel is smaller than a throughput area of the liquid container for dividing the liquid food material and the pressure towards the various dispensing openings,
   characterized in that the membrane is displaced by means of varying a medium pressure.

20. The method as claimed in claim 19, characterized in that the liquid food material is transferred to the dispensing openings with equal pressure by the transfer channel.

* * * * *